United States Patent
Sedovic

(10) Patent No.: US 11,403,132 B2
(45) Date of Patent: Aug. 2, 2022

(54) MANAGING TASKS IN A CLOUD COMPUTING ENVIRONMENT USING MULTIPLE ORCHESTRATION TOOLS

(71) Applicant: Red Hat, Inc., Raleigh, NC (US)

(72) Inventor: Tomas Sedovic, Brno (CZ)

(73) Assignee: RED HAT, INC., Raleigh, NC (US)

( * ) Notice: Subject to any disclaimer, the term of this patent is extended or adjusted under 35 U.S.C. 154(b) by 175 days.

(21) Appl. No.: 15/646,196

(22) Filed: Jul. 11, 2017

(65) Prior Publication Data

US 2019/0018703 A1   Jan. 17, 2019

(51) Int. Cl.
G06F 9/48      (2006.01)
H04L 67/51    (2022.01)
G06F 16/27    (2019.01)
G06F 16/901  (2019.01)

(52) U.S. Cl.
CPC ............ G06F 9/4843 (2013.01); G06F 16/27 (2019.01); G06F 16/9017 (2019.01); H04L 67/16 (2013.01)

(58) Field of Classification Search
None
See application file for complete search history.

(56) References Cited

U.S. PATENT DOCUMENTS

| | | | |
|---|---|---|---|
| 8,417,713 B1 * | 4/2013 | Blair-Goldensohn | ................ G06F 16/9535 707/751 |
| 8,667,139 B2 | 3/2014 | Labat et al. | |
| 9,058,219 B2 | 6/2015 | Jaisinghani et al. | |
| 9,509,560 B2 | 11/2016 | Chen et al. | |
| 9,875,086 B1 * | 1/2018 | Anderson | ................ G06F 8/60 |

(Continued)

FOREIGN PATENT DOCUMENTS

WO   WO 2017/007466   1/2017

OTHER PUBLICATIONS

Sophia Turol, "Deployment Tools for Cloud Foundry: BOSH vs Juju Charms", https://www.altoros.com/blog/cloud-foundry-deployment-tools-bosh-vs-juju-charms/ (Year: 2015).*

(Continued)

*Primary Examiner* — Wynuel S Aquino
(74) *Attorney, Agent, or Firm* — Kilpatrick Townsend & Stockton LLP

(57) ABSTRACT

Tasks in a cloud computing environment can be managed using multiple orchestration tools. For example, a request to perform a particular task in a cloud computing environment can be received. A database that includes relationships between multiple orchestration tools and characteristics of the multiple orchestration tools can be accessed. A first orchestration tool can be selected from the database based on a first characteristic related to the first orchestration tool in the database. The first orchestration tool can be capable of performing a first part of the particular task. A second orchestration tool can be selected from the database based on a second characteristic related to the second orchestration tool in the database. The second orchestration tool can be capable of performing a second part of the particular task. The particular task can be performed in the cloud computing environment using the first orchestration tool and the second orchestration tool.

20 Claims, 4 Drawing Sheets

Database 110

| Orchestration Tool | Works with X cloud services provider | Works with Y cloud services provider | Works with Openstack | Can re-run, create, and debug Openstack resources | Can run and debug software configs. | Flexibility | Supports Z feature | Speed or ability to deploy a virtual resource | Familiarity |
|---|---|---|---|---|---|---|---|---|---|
| Heat | ✓ | ✗ | ✓ | 5 | 1 | 1 | ✓ | 4 | 3 |
| Ansible | ✓ | ✓ | ✓ | 2 | 4 | 4 | ✓ | 3 | 4 |
| Puppet | ✓ | ✓ | ✓ | 3 | 3 | 5 | ✗ | 2 | 1 |

202  204  206  208  210  212  214  216  218

(56) References Cited

U.S. PATENT DOCUMENTS

| | | | |
|---|---|---|---|
| 2003/0012209 A1* | 1/2003 | Abdelilah | H04L 47/2441 370/412 |
| 2010/0325637 A1* | 12/2010 | Radmilac | G06F 9/5083 718/104 |
| 2011/0314389 A1* | 12/2011 | Meredith | G06F 8/61 715/751 |
| 2012/0022004 A1 | 1/2012 | Bar-Or et al. | |
| 2014/0068623 A1* | 3/2014 | Kanemasa | G06F 9/4881 718/103 |
| 2014/0201218 A1* | 7/2014 | Catalano | G06F 8/60 707/748 |
| 2015/0120900 A1 | 4/2015 | Sahoo et al. | |
| 2016/0092526 A1 | 3/2016 | Kothari et al. | |
| 2016/0105493 A1* | 4/2016 | Bacher | H04L 67/10 709/217 |
| 2016/0149769 A1 | 5/2016 | Joshi et al. | |
| 2016/0197850 A1 | 7/2016 | Peng et al. | |
| 2016/0321051 A1* | 11/2016 | Austel | H04L 67/025 |
| 2017/0032281 A1 | 2/2017 | Hsu | |
| 2017/0371628 A1* | 12/2017 | Zhao | G06F 8/315 |
| 2018/0032322 A1* | 2/2018 | Jagannath | G06F 8/60 |

OTHER PUBLICATIONS

IPaaS: Integration for the Cloud, https://www.mulesoft.com/resources/cloudhub/ipaas-integration-platform-as-a-service.

Donvito, G., An Integrated IaaS and PaaS Architecture for Scientific Computing, http://digital.csic.es/bitstream/10261/140996/1/IaaSPaaS.pdf.

Driscoll, B., IaaS, EaaS, PaaS, and DevOps—Good for Absolutely Everything, Sep. 17, 2014, https://infocus.emc.com/bart_driscoll/iaas-eaas-paas-devops-good-forhuhabsolutely-everything/.

Cloud Orchestration Tools by Ravikian, https://www.slideshare.net/prk1980/cloud-orchestration-major-tools-comparision.

\* cited by examiner

Database 110

| Orchestration Tool | Works with X cloud services provider | Works with Y cloud services provider | Works with Openstack | Can re-run, create, and debug Openstack resources | Can run and debug software configs. | Flexibility | Supports Z feature | Speed or ability to deploy a virtual resource | Familiarity |
|---|---|---|---|---|---|---|---|---|---|
| Heat | y | x | y | 5 | 1 | 1 | y | 4 | 3 |
| Ansible | y | y | y | 2 | 4 | 4 | y | 3 | 4 |
| Puppet | y | y | y | 3 | 3 | 5 | x | 2 | 1 |
|  | 202 | 204 | 206 | 208 | 210 | 212 | 214 | 216 | 218 |

FIG. 2

MANAGING TASKS IN A CLOUD COMPUTING ENVIRONMENT USING MULTIPLE ORCHESTRATION TOOLS

TECHNICAL FIELD

The present disclosure relates generally to network resource allocation. More specifically, but not by way of limitation, this disclosure relates to managing tasks in a cloud computing environment using multiple orchestration tools.

BACKGROUND

An orchestration tool can be software used to virtualize, provision, or otherwise manage resources in a cloud computing environment, such as a software-as-a-service (SaaS) environment, a platform-as-a-service (PaaS) environment, or an infrastructure-as-a-service (IaaS) environment. Some orchestration tools can be used to, for example, deploy virtual machines in the cloud computing environment, manage physical resources (e.g., processing power, memory, or storage space) for the cloud computing environment, or install software in the cloud computing environment.

BRIEF DESCRIPTION OF THE DRAWINGS

FIG. 2 is a table of an example of orchestration tools and related characteristics according to some aspects.

DETAILED DESCRIPTION

Figure 1:
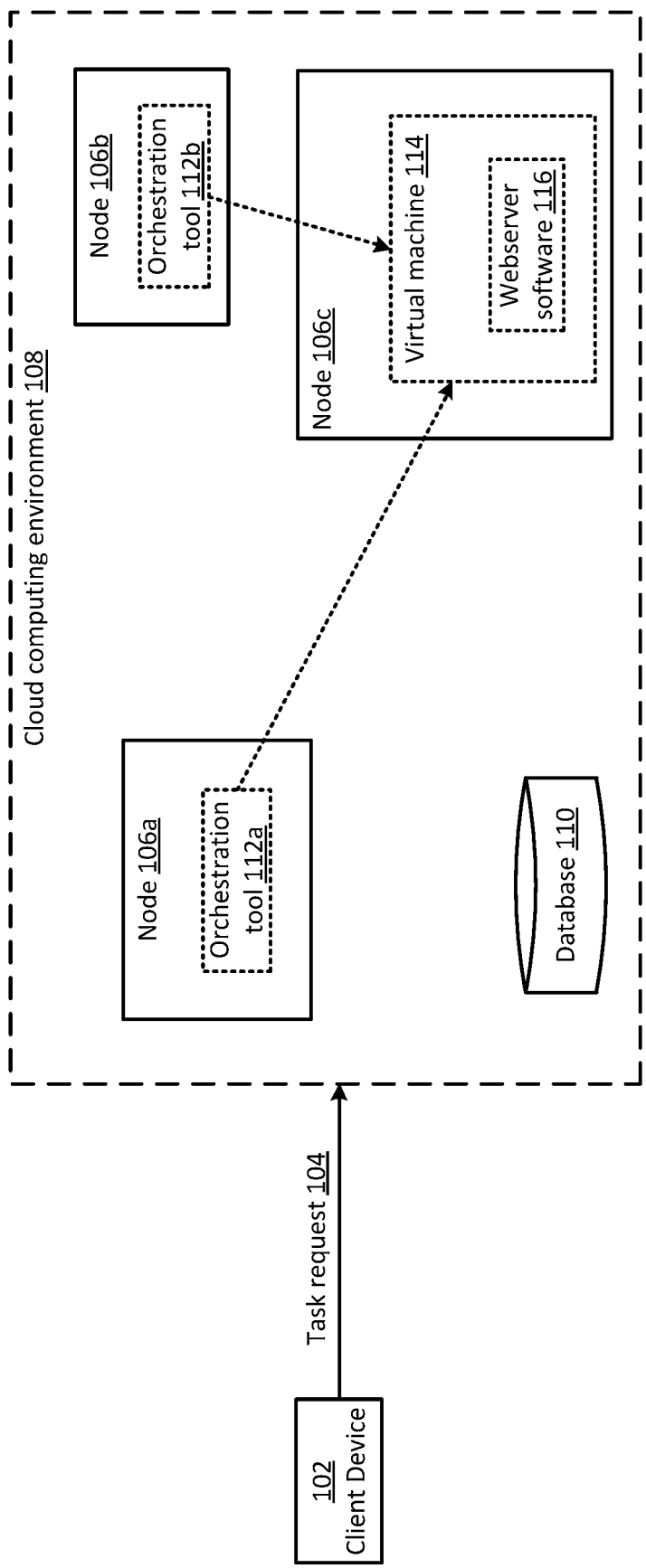
FIG. 1 is a block diagram of an example of a system for managing tasks in a cloud computing environment using multiple orchestration tools according to some aspects.

There are multiple different types of orchestration tools available for managing a cloud computing environment. Examples of orchestration tools can include Heat, Ansible, Puppet, Juju, SaltStack, Chef, Kubernetes, and CloudFormation. And each of these orchestration tools can have strengths and weaknesses. For example, some orchestration tools can only operate on systems of specific cloud-service providers, while other orchestration tools can integrate with any cloud-service provider. And some orchestration tools can only operate within a certain hardware or software framework, which may be computationally or financially expensive to configure, while other orchestration tools may be able to operate on any hardware or software framework. Further, some types of orchestration tools can perform certain tasks (e.g., deploying a virtual machine or installing software) faster than other types of orchestration tools. It can be challenging and time consuming for a user to identify the best orchestration tool to use for each particular task in a cloud computing environment.

Some examples of the present disclosure can overcome one or more of the abovementioned issues through the use of a database (e.g., a lookup table) that relates different types of orchestration tools to characteristics of the orchestration tools. Examples of the characteristics can include (i) whether the orchestration tool works with a particular cloud-service provider; (ii) whether the orchestration tool works with particular software, such as OpenStack; (iii) whether the orchestration tool can re-run, create, and debug certain types of resources, such as OpenStack resources; (iv) whether the orchestration tool can run and debug certain types of software configurations; (v) an indication of the flexibility of the orchestration tool; (vi) whether the orchestration tool supports or has a certain feature, such as the ability to provision virtual machines; (vii) a speed with which the orchestration tool can perform a certain task, such as installing software; (viii) an indication of a level of familiarity a user has with the orchestration tool; or (viii) any combination of these. A computing device can access the database and identify one or more orchestration tools to use to perform a particular task based on the characteristics of the orchestration tools. For example, the computing device can access the database and identify the "best" orchestration tool (relative to the other orchestration tools listed in the database) to use to perform a particular task based on the orchestration tool having a highest score associated with the particular task. The computing device can then use the orchestration tool(s) to perform the particular task. Some examples can provide a substantially automated process through which orchestration tools can be identified and used to perform a particular task in a cloud computing environment. This may reduce the amount of time, difficulty, and financial costs associated with configuring a cloud computing environment.

As a particular example, it can be challenging to install, update, operate, and otherwise configure an OpenStack-based cloud environment. Some examples of the present disclosure can simplify this process by splitting the configuration of the OpenStack-based cloud environment into multiple phases, and identifying one or more orchestration tools to use to implement each phase. For example, a first phase can include deploying the virtual resources for the OpenStack-based cloud environment. The computing device can access the database and determine that an orchestration tool named "Heat" has characteristics that make it superior (relative to the other orchestration tools listed in the database) for deploying virtual resources than other orchestration tools. So, the computing device can use Heat to deploy the virtual resources. A second phase can include installing and configuring services using the virtual resources. The computing device can also use the database to determine that orchestration tools named "Ansible" and "Puppet" have characteristics that make them superior for installing and configuring services. So, the computing device can select and use Ansible or Puppet to install and configure the services. In some examples, Puppet may have additional characteristics (e.g., pre-programmed modules for installing and configuring the particular services required in this example) that make it superior to Ansible for installing and configuring the particular services required in this example. So, the computing device may ultimately select and use Puppet to install and configure the services.

Another example involves installing OpenShift in an OpenStack-based infrastructure-as-a-service (IaaS) cloud environment. OpenShift is a container platform by Red Hat™ that can use Docker containers and the Kubernetes container cluster manager. In such an example, the computing device can split the installation process into a first phase for deploying OpenStack resources (e.g., virtual machines, network resources, volumes, etc.) and a second phase for deploying OpenShift using the OpenStack resources. The computing device can use the database to determine that Heat has characteristics that make it superior for deploying the OpenStack resources. So, the computing device can use Heat to deploy the OpenStack resources. And the computing device can use the database to determine that Ansible and Puppet have characteristics that make them superior for installing and OpenShift. So, the computing device can use Ansible or Puppet to install and configure OpenShift. In some examples, Ansible may have additional characteristics (e.g., pre-programmed modules for installing and configuring OpenShift) that make it superior to Puppet for installing OpenShift. So, the computing device may ultimately select Ansible to install OpenShift.

Yet another example involves deploying a cluster of servers having identical software and an identical configuration. In such an example, the computing device may determine that only one orchestration tool is required, because there is no need to configure complex, interdependent software. The computing device can access the database and determine that Heat has characteristics that make it superior for deploying a cluster of servers having identical software and an identical configuration. For example, Heat may excel at updating a group of identical software or resources. So, the computing device can select and use Heat to deploy the cluster of servers.

Another example involves deploying a hybrid cloud-computing environment that uses both Amazon Web Services (AWS) and OpenStack. This can be a relatively complex process. The computing device can use the database to determine that Ansible has characteristics that make it superior for coordinating such complex processes. So, the computing device can use Ansible to coordinate the process. The computing device can also use the database to determine that Heat has characteristics that make it superior for deploying the OpenStack resources. So, the computing device can use Ansible to cause Heat to deploy the OpenStack resources. The computing device can further the database to determine that CloudFormation has characteristics that make it superior for AWS. So, the computing device can use Ansible to cause CloudFormation to configure the portion of the hybrid cloud-computing environment that uses AWS. In some examples, the computing device can use the database to determine that Ansible is also superior for installing OpenShift. So, the computing device can use Ansible to install OpenShift on the hybrid cloud-computing environment.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system for managing tasks in a cloud computing environment 108 using multiple orchestration tools 112*a-b* according to some aspects. The system includes a client device 102 in communication with the cloud computing environment 108 (e.g., one or more nodes 106*a-c* in the cloud computing environment 108). The client device 102 can submit a task request 104 to the cloud computing environment 108. The cloud computing environment 108 can receive the task request and determine which orchestration tools to use to perform the task by accessing a database 110. For example, the cloud computing environment 108 can use the database to determine one or more orchestration tools, such as orchestration tools 112*a-b*, having certain characteristics that enable the orchestration tools to perform the task. The cloud computing environment 108 can then use the orchestration tools to perform the task.

More specifically, as discussed above, the system can include a client device 102. Examples of the client device can include a desktop computer, laptop computer, server, mobile device, tablet, or any combination of these. The client device 102 can transmit one or more task requests to a cloud-service provider to cause the cloud-service provider to perform one or more tasks. Examples of the cloud-service provider can include AWS, Microsoft Azure, Google Cloud Platform, and IBM Cloud. The tasks may be part of a process for deploying or configuring the cloud computing environment 108.

The cloud computing environment 108 can be a software-as-a-service (SaaS) environment, a platform-as-a-service (PaaS) environment, an infrastructure-as-a-service (IaaS) environment, or another type of cloud computing environment. And the cloud computing environment 108 can be formed from any number and combination of nodes, such as nodes 106*a-c*. Examples of the nodes can include computing devices, servers, virtual machines, or any combination of these. The nodes can individually or collectively work together to perform functions in the cloud computing environment 108.

In some examples, the cloud computing environment 108 includes the database 110. For example, node 106*a* can include the database 110. In other examples, the database 110 can be external to the cloud computing environment 108 and remotely accessed by the cloud computing environment 108. Either way, the cloud computing environment 108 is capable of reading data from the database 110.

The database 110 can include relationships between orchestration tools and the characteristics of the orchestration tools. One example of the database 110 is shown in FIG. 2. In the example shown in FIG. 2, each row in the database 110 is for a different type of orchestration tool (e.g., Heat, Ansible, and Puppet). And each column in the database 110 is related to a different type of characteristic for an orchestration tool. Column 202 includes information indicating whether the orchestration tool works with a particular (designated as X) cloud-services provider, such as AWS. Column 204 includes information indicating whether the orchestration tool works with another (designated as Y) cloud-services provider, such as Google Cloud Platform. Column 206 includes information indicating whether the orchestration tool works with OpenStack, which is a set of software tools for building and managing cloud computing platforms for public and private clouds. Column 208 includes information indicating whether the orchestration tool can re-run, create, and debug OpenStack resources. Column 210 includes information indicating whether the orchestration tool can run and debug certain software configurations. Column 212 includes information indicating a level of flexibility of the orchestration tool. Column 214 includes information indicating whether the orchestration tool supports a certain feature (designated as Z). Column 216 includes information indicating a speed or ability of the orchestration tool to deploy a virtual resource. Column 218 includes information indicating a level of familiarity that a user may have with the orchestration tool. These are merely illustrative examples, and the database 110 can include any number and combination of columns indicating any number and combination of characteristics of any number and combination of orchestration tools. And the database 110 may include alternative combinations of data elements that are different from the tabular structure shown in FIG. 2.

In some examples, the database 110 can use a binary format (e.g., yes or no) to indicate a characteristic of an orchestration tool. For example, column 204 has check marks and X's to indicate if an orchestration tool has a particular feature. Additionally or alternatively, the database 110 can use a discrete or continuous scale to indicate a characteristic of an orchestration tool. In the example shown in FIG. 2, the database 110 uses a scale between 1 and 5 to indicate a characteristic of an orchestration tool, where 1 indicates a low or undesirable value and 5 indicates a high or desirable value. For example, the value of 1 in column 212 for Heat may indicate that Heat has a relatively low level of flexibility, whereas the value of 5 in column 212 for Puppet may indicate that Puppet has a relatively high level of flexibility. As another example, the value of 1 in column 218 for Puppet may indicate that a user has a relatively low level of familiarity with Puppet, whereas the value of 4 in column 218 for Ansible may indicate that the user has a relatively high level of familiarity with Ansible. As still another example, the value of 2 in column 216 for Puppet may indicate that Puppet deploys virtual resources at a relatively low speed, whereas the value of 4 in column 216 for Heat may indicate that Heat deploys virtual resources at a relatively high speed. Any number and combination of techniques can be used to indicate characteristics of orchestration tools in the database 110.

In some examples, the database 110 can be manually created by a user or team of users. For example, a team of users that manage the cloud computing environment 108 can analyze each type of orchestration tool and create or update at least one column or one row of the database 110. In other examples, the database 110 can be created in a substantially automated manner. For example, a computing device (e.g., one of the nodes 106a-c) can receive user input indicating which orchestration tools are to be included in the database 110. The computing device can then analyze installation files, configuration files, online resources (e.g., websites), and other resources related to each orchestration tool to identify the characteristics of the orchestration tool and build the database 110. The computing device can analyze any number and combination of information to substantially automatically build the database 110.

The cloud computing environment 108 can access the database 110 to determine which orchestration tool(s) to use to perform a task, such as the task requested by the client device 102. For example, the cloud computing environment 108 can access the database to determine that at least a portion of the task is to be performed using one orchestration tool 112a based on the orchestration tool 112a having one characteristic, and another portion of the task is to be performed using another orchestration tool 112b based on the orchestration tool 112b having another characteristic. The cloud computing environment 108 can then perform the task using the determined orchestration tools. The cloud computing environment 108 can use any number and combination of orchestration tools to perform a task. And, although FIG. 1 shows orchestration tool 112a on node 106a and orchestration tool 112b on node 106b, the cloud computing environment 108 can have any configuration of orchestration tools on any number and combination of nodes.

As a particular example, if the task is to configure a webserver within the cloud computing environment 108, the cloud computing environment 108 can determine that orchestration tool 112a is the "best" orchestration tool to use (relative to other orchestration tools in the database 110) to provision a virtual machine 114 for the webserver. The cloud computing environment 108 can make this determination because, for example, orchestration tool 112a may have a highest score in column 216 of the database 110. And having the highest score in column 216 may indicate that orchestration tool 112a is the fastest at deploying virtual machines among the orchestration tools listed in the database 110. In some examples, the cloud computing environment 108 can also determine that orchestration tool 112b is the "best" orchestration tool to use to install the webserver software 116 for the webserver. The cloud computing environment 108 can make this determination because, for example, orchestration tool 112b may have a check mark in column 214 of the database 110. This may indicate that orchestration tool 112b supports the webserver software 116. The webserver can then be configured within the cloud computing environment 108 by using the orchestration tool 112a to provision the virtual machine 114 and the orchestration tool 112b to install the webserver software 116.

The cloud computing environment 108 can weight, triage, or prioritize characteristics of the orchestration tools to determine which orchestration tool(s) to use to perform a particular task. For example, a task may include installing certain software in the cloud computing environment 108. Two orchestration tools 112a-b may have the same score (e.g., 5) related to supporting the software. But one of the orchestration tools 112a may have a higher score related to the speed at which the orchestration tool 112a can install the software than the other orchestration tool 112b. In such an example, the cloud computing environment 108 can break the tie in favor of orchestration tool 112a based on the orchestration tool 112a having the higher score related to the speed. As another example, orchestration tool 112a can have a lower score (e.g., 3) related to supporting the software than orchestration tool 112b, but a higher score (e.g., 5) related to the speed at which the orchestration tool 112a can install the software than orchestration tool 112b. The cloud computing environment 108 can determine that this combination of scores results in the orchestration tool 112a being superior over orchestration tool 112b to perform the task. For example, the cloud computing environment 108 can determine that an average of the scores for orchestration tool 112a is greater than an average of the scores for orchestration tool 112b, and therefore select orchestration tool 112a. In some examples, each characteristic in the database 110 can be assigned a rank or weight. For example, the rank or weight for each characteristic can be included in the database 110, in another database, or indicated elsewhere. The cloud computing environment 108 can use the ranks or weights of the characteristics to prioritize orchestration tools over one another. The cloud computing environment 108 can analyze any number and combination of characteristics of the orchestration tools to determine which orchestration tool to use for a particular task.

Figure 3:
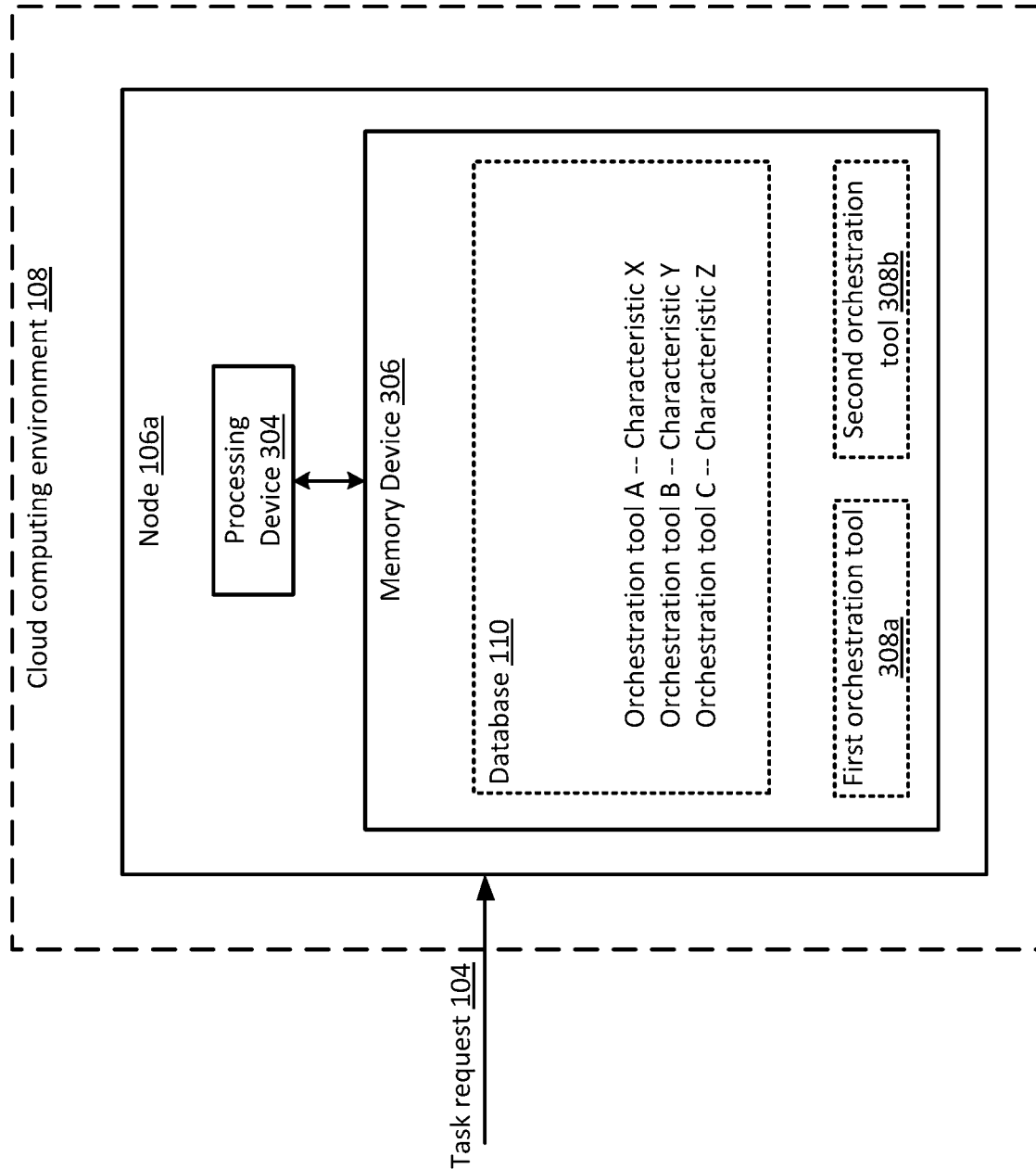
FIG. 3 is a block diagram of an example of another system for managing tasks in a cloud computing environment using multiple orchestration tools according to some aspects.

FIG. 3 is a block diagram of an example of another system for managing tasks in a cloud computing environment 108 using multiple orchestration tools 308a-b according to some aspects. The system includes the cloud computing environment 108, the database 110, and the node 106a of FIG. 2. In this example, node 106a receives a task request 104 (e.g., from a client device) for performing a particular task, accesses the database 110 to determine relationships between orchestration tools (e.g., A, B, and C) and characteristics (e.g., X, Y, and Z) of the orchestration tools, and selects at least two orchestration tools 308a-b to use to perform the particular task. Node 106a can then use a first orchestration tool 308a to perform a first part of the particular task and a second orchestration tool 308b to perform a second part of the particular task. In some examples, the node 106a communicates with another node (e.g., node 106b from FIG. 2) to perform the first part of the particular task. Additionally or alternatively, node 106a can communicate with another node (e.g., node 106c from FIG. 2) to perform the second part of the particular task. Node 106a can communicate with any number and combination of nodes to perform the particular task.

The node 106a can include a processing device 304 communicatively coupled to a memory device 306. The processing device 304 can include one processing device or multiple processing devices. Non-limiting examples of the processing device 304 include a Field-Programmable Gate Array (FPGA), an application-specific integrated circuit (ASIC), a microprocessor, etc.

The processing device 304 can execute one or more operations for managing tasks in a cloud computing environment using multiple orchestration tools. The processing device 304 can execute instructions stored in the memory device 306 to perform the operations. In some examples, the instructions can include processor-specific instructions generated by a compiler or an interpreter from code written in any suitable computer-programming language, such as C, C++, C#, etc.

Memory device 306 can include one memory device or multiple memory devices. The memory device 306 can be non-volatile and may include any type of memory device that retains stored information when powered off. Non-limiting examples of the memory device 306 include electrically erasable and programmable read-only memory (EEPROM), flash memory, or any other type of non-volatile memory. In some examples, at least some of the memory device can include a medium from which the processing device 304 can read instructions. A computer-readable medium can include electronic, optical, magnetic, or other storage devices capable of providing the processing device with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read instructions.

In some examples, the memory device 306 includes the database 110, the first orchestration tool 308a, the second orchestration tool 308b, or any combination of these. For example, the memory device 306 can include program code for the first orchestration tool 308a, the second orchestration tool 308b, or both of these.

Figure 4:
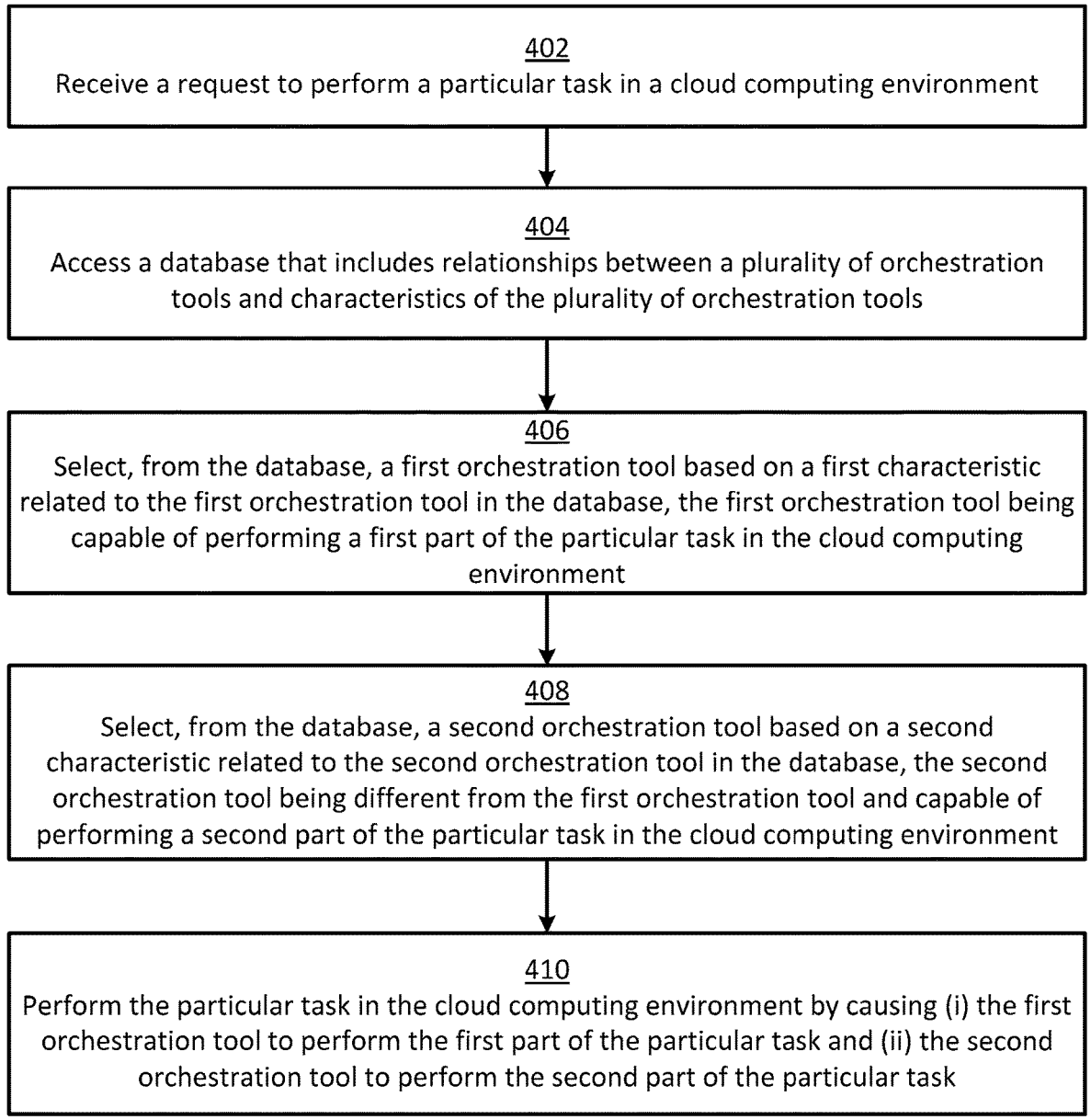
FIG. 4 is a flow chart of an example of a process for managing tasks in a cloud computing environment using multiple orchestration tools according to some aspects according to some aspects.

FIG. 4 is a flow chart of an example of a process for managing tasks in a cloud computing environment using multiple orchestration tools according to some aspects according to some aspects. Other examples can include more steps, fewer steps, different steps, or a different order of the steps depicted in FIG. 4. The steps of FIG. 4 are described below with reference to components discussed above.

In block 402, a node 106a receives a task request 104 to perform a particular task in a cloud computing environment 108. Examples of the task can include installing, building, or configuring software within the cloud computing environment 108. The node 106a can receive the request from a client device 102 or another device.

In block 404, the node 106a accesses a database 110 that includes relationships between a plurality of orchestration tools and characteristics of the plurality of orchestration tools. For example, the node 106a can communicate with a database server over the Internet to access the database 110, or the database 110 can be stored in a local memory (e.g., memory device 306) of the node 106a and accessed from the local memory.

In block 406, the node 106a selects, from the database 110, a first orchestration tool 308a based on a first characteristic related to the first orchestration tool 308a in the database 110. The first orchestration tool 308a can be capable of performing a first part of the particular task in the cloud computing environment 108. In some examples, the first part of the particular task can include at least one of: (i) provisioning a virtual machine; (ii) configuring a particular network resource in the cloud computing environment 108; (iii) configuring a particular data-storage resource for use in the cloud computing environment 108; or (iv) configuring the cloud computing environment 108 to have an autoscaling capability in which an amount of computer resources dedicated to a task is increased or decreased based on conditions of the cloud computing environment 108.

For example, the node 106a can select the first orchestration tool 308a based on a score corresponding to the first orchestration tool 308a in the database 110. The score can reflect an ability or speed with which the first orchestration tool 308a can perform the first part of the particular task. In some examples, the first characteristic can include a score that indicates at least one of (i) an ability of the first orchestration tool 308a to perform the first part of the particular task, (ii) a speed at which the first orchestration tool 308a performs the first part of the particular task, (iii) a monetary cost for using the first orchestration tool 308a to perform the first part of the particular task; (iv) a level of familiarity that a user has with the first orchestration tool 308a; or (v) any combination of these. For example, the score can be indicative of at least one of (a) the ability of the first orchestration tool 308a to configure the cloud computing environment 108 using a predesignated provider of cloud services; (b) the ability of the first orchestration tool to configure the cloud computing environment 108 to have a particular piece of software; (d) the speed at which the first orchestration tool 308a installs or executes software in the cloud computing environment 108; (e) the speed at which the first orchestration tool 308a deploys a virtual machine in the cloud computing environment 108; (f) the speed at which the first orchestration tool 308a deploys a virtual resource in the cloud computing environment 108; (vi) the ability of the first orchestration tool 308a to debug an error; or (vii) any combination of these.

In block 408, the node 106a selects, from the database 110, a second orchestration tool 308b based on a second characteristic related to the second orchestration tool 308b in the database 110. The second orchestration tool 308b can be different from the first orchestration tool 308a and capable of performing a second part of the particular task in the cloud computing environment 108. In some examples, the second part of the particular task can include any of the options listed above with respect to the first part of the particular task described in block 406.

For example, the node 106a can select the second orchestration tool 308b based on a score corresponding to the second orchestration tool 308b in the database 110. The score can reflect an ability or speed with which the second orchestration tool 308b can perform the second part of the particular task. In some examples, the second characteristic can include a score that is indicative of any of the options listed above with respect to the first characteristic described in block 406.

In block 410, the node 106a can perform the particular task in the cloud computing environment 108 by causing (i) the first orchestration tool 308a to perform the first part of the particular task and (ii) the second orchestration tool 308b to perform the second part of the particular task.

For example, the node 106a can communicate commands to the first orchestration tool 308a to cause the first orchestration tool 308a to perform the first part of the particular task. The node 106a can additionally or alternatively communicate commands to the second orchestration tool 308b to cause the second orchestration tool 308b to perform the second part of the particular task. The node 106a can issue any number and combination of commands to implement the particular task using the orchestration tools 308a-b.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A method comprising:
   receiving, by a computing device, a request to perform a configuration process for configuring a cloud computing environment, wherein the configuration process includes a first phase in which one or more virtual resources are deployed in the cloud computing environment and a second phase in which software or services are configured in the cloud computing environment using the one or more virtual resources; and
   in response to the request:
      accessing, by the computing device, a database that includes a plurality of entries that specify relationships between a plurality of orchestration tools and a plurality of functional capabilities associated with the plurality of orchestration tools, each orchestration tool in the plurality of orchestration tools being a respective piece of downloadable software, wherein each entry in the plurality of entries corresponds to a respective orchestration tool of the plurality of orchestration tools and includes a plurality of fields corresponding to the plurality of functional capabilities, and wherein the plurality of functional capabilities include two or more capabilities selected from the following group of capabilities:
         a first capability of the respective orchestration tool to work with a particular cloud-services provider;
         a second capability of the respective orchestration tool to work with a set of software tools for building and managing cloud computing platforms;
         a third capability of the respective orchestration tool to run, create, and debug resources;
         a fourth capability of the respective orchestration tool to run and debug certain software configurations;
         a fifth capability of the respective orchestration tool to support a certain feature:
         a sixth capability of the respective orchestration tool to deploy a virtual resource; and
         a seventh capability of the respective orchestration tool to have a certain level of flexibility;
      selecting, by the computing device, a first orchestration tool from among the plurality of orchestration tools based on a first relationship in the database between the first orchestration tool and a first functional capability among the plurality of functional capabilities, the first functional capability being one of the first through seventh capabilities, wherein the first relationship indicates that the first orchestration tool is superior to a second orchestration tool in at least one way with respect to implementing the first phase of the configuration process;
      selecting, by the computing device, the second orchestration tool from among the plurality of orchestration tools based on a second relationship in the database between the second orchestration tool and a second functional capability among the plurality of functional capabilities, the second orchestration tool being different from the first orchestration tool, the second functionality capability being another one of the first through seventh capabilities that is different from the first functional capability, wherein the second relationship indicates that the second orchestration tool is superior to the first orchestration tool in at least one way with respect to implementing the second phase of the configuration process; and
      performing, by the computing device, the requested configuration process by causing the selected first orchestration tool to implement the first phase and the selected second orchestration tool to implement the second phase.

2. The method of claim 1, wherein the database is a lookup table, and the first phase includes at least one of: (i) provisioning a virtual machine; (ii) configuring a particular network resource in the cloud computing environment; (iii) configuring a particular data-storage resource for use in the cloud computing environment; or (iv) configuring the cloud computing environment to have an autoscaling capability in which an amount of computer resources dedicated to a task is increased or decreased based on conditions of the cloud computing environment.

3. The method of claim 1, wherein the first relationship is expressed as a numerical score in the database.

4. The method of claim 1, wherein the first functional capability includes the second capability or third capability.

5. The method of claim 1, wherein the first functionality capability is the first capability, and wherein:
   the first phase includes configuring the cloud computing environment using the particular cloud-services provider;
   the first relationship indicates that the first orchestration tool has the first functional capability; and
   another relationship in the database between another orchestration tool among the plurality of orchestration tools and the first functional capability indicates that the other orchestration tool lacks the first functional capability such that the other orchestration tool is incapable of configuring the cloud computing environment using the particular cloud-services provider.

6. The method of claim 1, wherein the first relationship indicates that the first orchestration tool is capable of performing the first functional capability faster than at least one other orchestration tool specified in the database.

7. The method of claim 1, wherein:
   the first phase includes allocating computing resources for a cluster of nodes that forms at least a portion of the cloud computing environment; and
   the second phase includes installing software on the cluster of nodes.

8. The method of claim 1, wherein the plurality of orchestration tools are configured to provision and manage resources in the cloud computing environment.

9. The method of claim 1, wherein the plurality of fields includes at least three fields, and wherein the plurality of functional capabilities includes at least three different types of functional capabilities corresponding to the at least three fields.

10. A system comprising:
a processor; and
a non-transitory computer-readable medium on which instructions executable by the processor are stored for causing the processor to:
receive a request to perform a configuration process for configuring a cloud computing environment, wherein the configuration process includes a first phase in which virtual resources are deployed in the cloud computing environment and a second phase in which software or services are configured in the cloud computing environment; and
in response to the request:
access a database that includes a plurality of entries that specify relationships between a plurality of orchestration tools and a plurality of functional capabilities associated with the plurality of orchestration tools, each orchestration tool in the plurality of orchestration tools being a respective piece of downloadable software, wherein each entry in the plurality of entries corresponds to a respective orchestration tool of the plurality of orchestration tools and includes a plurality of fields corresponding to the plurality of functional capabilities, and wherein the plurality of functional capabilities include two or more capabilities selected from the following group of capabilities:
a first capability of the respective orchestration tool to work with a particular cloud-services provider;
a second capability of the respective orchestration tool to work with a set of software tools for building and managing cloud computing platforms;
a third capability of the respective orchestration tool to run, create, and debug resources;
a fourth capability of the respective orchestration tool to run and debug certain software configurations;
a fifth capability of the respective orchestration tool to support a certain feature;
a sixth capability of the respective orchestration tool to deploy a virtual resource; and
a seventh capability of the respective orchestration tool to have a certain level of flexibility;
select a first orchestration tool from among the plurality of orchestration tools based on a first relationship in the database between the first orchestration tool and a first functional capability among the plurality of functional capabilities, the first functional capability being one of the first through seventh capabilities, wherein the first relationship indicates that the first orchestration tool is superior to a second orchestration tool in at least one way with respect to implementing the first phase of the configuration process;
select the second orchestration tool from among the plurality of orchestration tools based on a second relationship in the database between the second orchestration tool and a second functional capability among the plurality of functional capabilities, the second orchestration tool being different from the first orchestration tool, the second functionality capability being another one of the first through seventh capabilities that is different from the first functional capability, wherein the second relationship indicates that the second orchestration tool is superior to the first orchestration tool in at least one way with respect to implementing the second phase of the configuration process; and
perform the requested configuration process by causing the selected first orchestration tool to implement the first phase and the selected second orchestration tool to implement the second phase.

11. The system of claim 10, wherein the database is a lookup table, and the first phase includes at least one of: (i) provisioning a virtual machine; (ii) configuring a particular network resource in the cloud computing environment; (iii) configuring a particular data-storage resource for use in the cloud computing environment; or (iv) configuring the cloud computing environment to have an autoscaling capability in which an amount of computer resources dedicated to a task is increased or decreased based on conditions of the cloud computing environment.

12. The system of claim 10, wherein the first relationship is expressed as a numerical score in the database.

13. The system of claim 10, wherein the first functional capability includes the second capability or the third capability.

14. The system of claim 10, wherein the first functionality capability is the first capability, and wherein:
the first phase includes configuring the cloud computing environment using the particular cloud-services provider;
the first relationship indicates that the first orchestration tool has the first functional capability; and
another relationship in the database between another orchestration tool among the plurality of orchestration tools and the first functional capability indicates that the other orchestration tool lacks the first functional capability such that the other orchestration tool is incapable of configuring the cloud computing environment using the particular cloud-services provider.

15. The system of claim 10, wherein the first relationship indicates that the first orchestration tool is capable of performing the first functional capability faster than at least one other orchestration tool specified in the database.

16. The system of claim 10, wherein:
the first phase includes allocating computing resources for a cluster of nodes that forms at least a portion of the cloud computing environment; and
the second phase includes installing software on the cluster of nodes.

17. A non-transitory computer-readable medium comprising program code that is executable by a processing device for causing the processing device to:
receive a request to perform a configuration process for configuring a cloud computing environment, wherein the configuration process includes a first phase in which virtual resources are deployed in the cloud computing environment and a second phase in which software or services are configured in the cloud computing environment;
access a database that includes a plurality of entries that specify relationships between a plurality of orchestration tools and a plurality of functional capabilities associated with the plurality of orchestration tools, each orchestration tool in the plurality of orchestration tools being a respective piece of downloadable software, wherein each entry in the plurality of entries corresponds to a respective orchestration tool of the plurality of orchestration tools and includes a plurality of fields corresponding to the plurality of functional capabilities, and wherein the plurality of functional capabilities include two or more capabilities selected from the following group of capabilities:
  a first capability of the respective orchestration tool to work with a particular cloud-services provider;
  a second capability of the respective orchestration tool to work with a set of software tools for building and managing cloud computing platforms;
  a third capability of the respective orchestration tool to run, create, and debug resources;
  a fourth capability of the respective orchestration tool to run and debug certain software configurations;
  a fifth capability of the respective orchestration tool to support a certain feature;
  a sixth capability of the respective orchestration tool to deploy a virtual resource; and
  a seventh capability of the respective orchestration tool to have a certain level of flexibility;
select a first orchestration tool from among the plurality of orchestration tools based on a first relationship in the database between the first orchestration tool and a first functional capability among the plurality of functional capabilities, the first functional capability being one of the first through seventh capabilities, wherein the first relationship indicates that the first orchestration tool is superior to a second orchestration tool in at least one way with respect to implementing the first phase of the configuration process;
select the second orchestration tool from among the plurality of orchestration tools based on a second relationship in the database between the second orchestration tool and a second functional capability among the plurality of functional capabilities, the second orchestration tool being different from the first orchestration tool, the second functionality capability being another one of the first through seventh capabilities that is different from the first functional capability, wherein the second relationship indicates that the second orchestration tool is superior to the first orchestration tool in at least one way with respect to implementing the second phase of the configuration process; and
perform the requested configuration process by causing the selected first orchestration tool to implement the first phase and the selected second orchestration tool to implement the second phase.

18. The non-transitory computer-readable medium of claim 17, wherein the database is a lookup table, and the first phase includes at least one of: (i) provisioning a virtual machine; (ii) configuring a particular network resource in the cloud computing environment; (iii) configuring a particular data-storage resource for use in the cloud computing environment; or (iv) configuring the cloud computing environment to have an autoscaling capability in which an amount of computer resources dedicated to a task is increased or decreased based on conditions of the cloud computing environment.

19. The non-transitory computer-readable medium of claim 17, wherein the first functional capability includes the second capability or the third capability.

20. The non-transitory computer-readable medium of claim 17, wherein the first functionality capability is the first capability, and wherein:
  the first phase includes configuring the cloud computing environment using the particular cloud-services provider;
  the first relationship indicates that the first orchestration tool has the first functional capability; and
  another relationship in the database between another orchestration tool among the plurality of orchestration tools and the first functional capability indicates that the other orchestration tool lacks the first functional capability such that the other orchestration tool is incapable of configuring the cloud computing environment using the particular cloud-services provider.

* * * * *